(12) United States Patent
Kamata et al.

(10) Patent No.: US 7,927,467 B2
(45) Date of Patent: Apr. 19, 2011

(54) METHOD OF MANUFACTURING DISCRETE TRACK RECORDING MEDIUM AND DISCRETE TRACK RECORDING MEDIUM

(75) Inventors: Yoshiyuki Kamata, Tokyo (JP); Satoshi Shirotori, Yokohama (JP); Kaori Kimura, Tokyo (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 115 days.

(21) Appl. No.: 12/400,446

(22) Filed: Mar. 9, 2009

(65) Prior Publication Data
US 2009/0195929 A1   Aug. 6, 2009

Related U.S. Application Data

(63) Continuation of application No. PCT/JP2008/061676, filed on Jun. 20, 2008.

(30) Foreign Application Priority Data

Jun. 28, 2007   (JP) ................. 2007-171075

(51) Int. Cl.
C23C 14/34  (2006.01)
B44C 1/22  (2006.01)

(52) U.S. Cl. ......... 204/192.34; 204/192.32; 204/192.35; 204/192.37; 216/22

(58) Field of Classification Search ............. 204/192.32, 204/192.34, 192.35, 192.37; 216/22
See application file for complete search history.

(56) References Cited

U.S. PATENT DOCUMENTS

| | | | |
|---|---|---|---|
| 7,156,961 | B2 | 1/2007 | Okatani et al. |
| 2005/0045581 | A1 | 3/2005 | Suwa et al. |

FOREIGN PATENT DOCUMENTS

| | | |
|---|---|---|
| JP | 06-116761 | 4/1994 |
| JP | 2002-212713 | 7/2002 |
| JP | 2005-135455 | 5/2005 |
| JP | 2005-235357 | 9/2005 |
| JP | 2005-267736 | 9/2005 |
| JP | 2007-012119 | 1/2007 |
| JP | 2007-213730 | 8/2007 |
| JP | 2007-257801 | 10/2007 |

OTHER PUBLICATIONS

International Search Report dated Sep. 22, 2008 for PCT/JP2008/061676.
Japanese Office Action dated Oct. 26, 2010.

*Primary Examiner* — Rodney G McDonald
(74) *Attorney, Agent, or Firm* — Pillsbury Winthrop Shaw Pittman, LLP

(57) ABSTRACT

According to one embodiment, a method of manufacturing a discrete track recording medium includes forming protruded magnetic patterns on a substrate, and repeating processes of depositing a nonmagnetic material so as to be filled in recesses between the magnetic patterns and etching back the nonmagnetic material two or more times with rotating the substrate in a plane thereof by an angle less than one revolution.

3 Claims, 5 Drawing Sheets

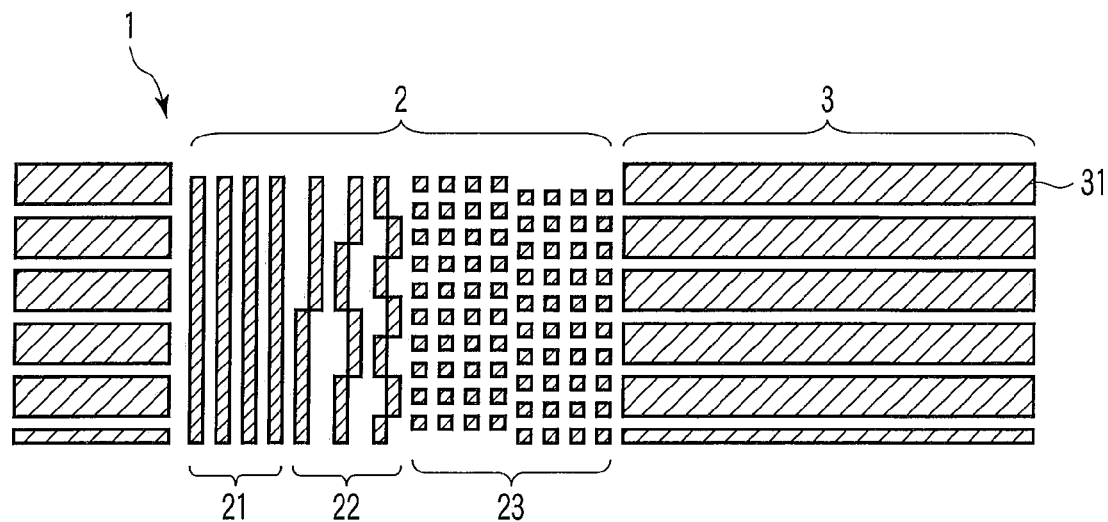
F I G. 1
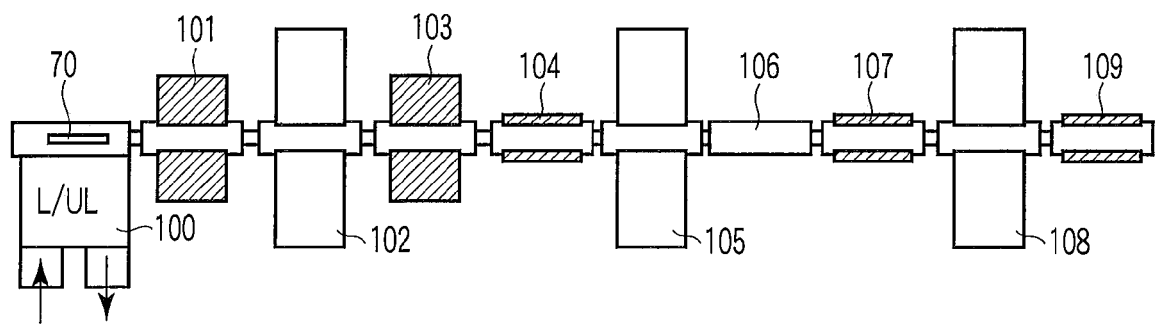
F I G. 3

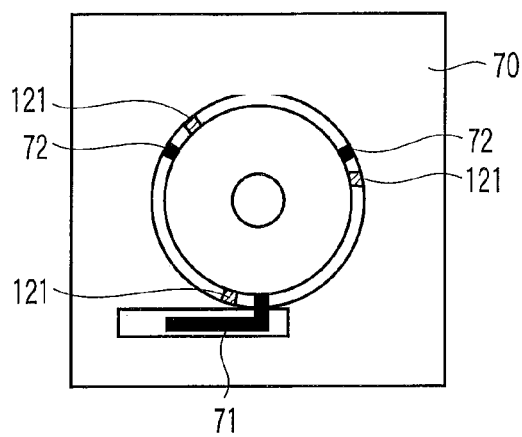
F I G. 4A
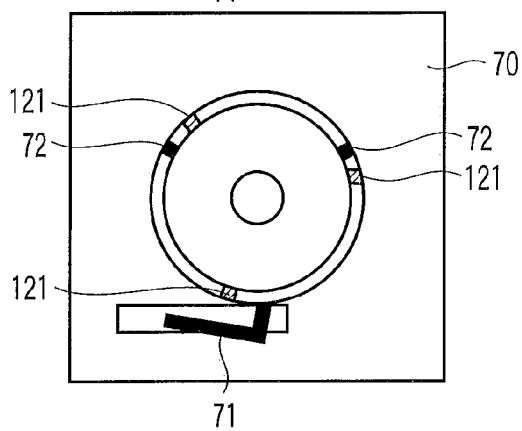
F I G. 4B
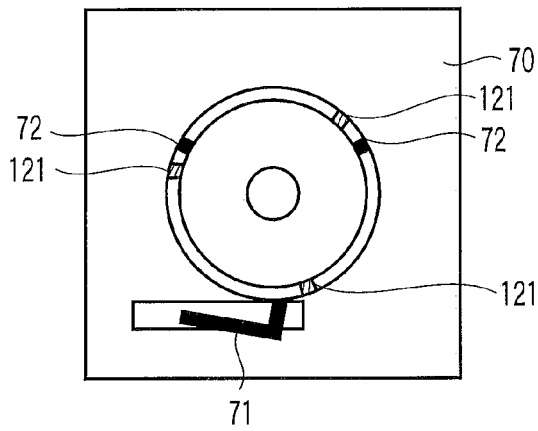
F I G. 4C
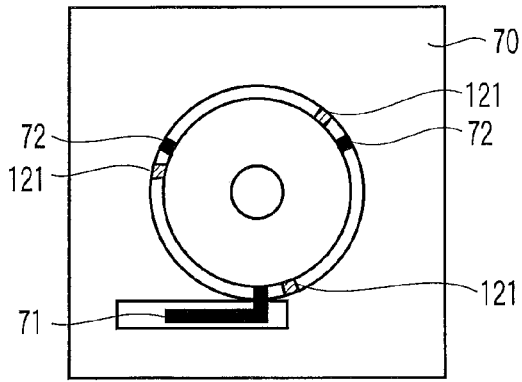
F I G. 4D

METHOD OF MANUFACTURING DISCRETE TRACK RECORDING MEDIUM AND DISCRETE TRACK RECORDING MEDIUM

CROSS REFERENCE TO RELATED APPLICATIONS

This is a Continuation Application of PCT Application No. PCT/JP2008/061676, filed Jun. 20, 2008, which was published under PCT Article 21(2) English.

This application is based upon and claims the benefit of priority from Japanese Patent Application No. 2007-171075, filed Jun. 28, 2007, the entire contents of which are incorporated herein by reference.

BACKGROUND

1. Field

One embodiment of the present invention relates to a method of manufacturing a discrete track recording medium and a discrete track recording medium manufactured by this method.

2. Description of the Related Art

Recently, in the magnetic recording medium incorporated into hard disk drives (HDDs), there is an increasing problem of disturbance of enhancement of track density due to interference between adjacent tracks. In particular, a serious technical subject is reduction of write blurring due to fringe effect of magnetic fields from a write head.

To solve such a problem, for example, a discrete track recording-type patterned medium (DTR medium) has been proposed in which recording tracks are physically separated. The DTR medium is capable of reducing a side erase phenomenon of erasing information of an adjacent track in writing or a side read phenomenon of reading out information of an adjacent track in reading, and is hence known to enhance the track density. Therefore, the DTR medium is expected as a magnetic recording medium capable of providing a high recording density.

To read and write a DTR medium with a flying head, it is desired to flatten the surface of the DTR medium. Specifically, in order to separate adjacent tracks completely, for example, a protective layer with a thickness of about 4 nm and a magnetic recording layer with a thickness of about 20 nm are removed to form recesses of about 24 nm in depth, thereby forming magnetic patterns. On the other hand, since the designed flying height of the flying head is about 10 nm, head flying is made unstable if deep recesses are left remained. Accordingly, it has been attempted to fill the recesses between magnetic patterns with a nonmagnetic material so as to flatten the medium surface for ensuring flying stability of the head.

Conventionally, the following method has been proposed to obtain a DTR medium having a flat surface by filling the recesses between magnetic patterns with a nonmagnetic material. For example, in a known method, by two-stage bias sputtering, the recesses between magnetic patterns are filled with a nonmagnetic material, and a DTR medium of a flat surface is manufactured (see Japanese Patent No. 3686067). However, when the recesses of the DTR medium are filled with a nonmagnetic material by bias sputtering, it has been known that the magnetic recording medium is deteriorated and degenerated due to temperature rise by substrate bias.

The temperature rise may be avoided by performing bias sputtering while forcedly cooling the substrate, but to forcedly cool the substrate, the rear surface of the substrate must be fitted tightly to the cooling mechanism. In this case, the rear surface of the substrate may be injured, and it has been found that the both surfaces cannot be processed by bias sputtering in principle. If the both surfaces cannot be processed, the recording capacity of the DTR medium is reduced to half.

Hence, by employing a deposition method capable of processing both surfaces, and in order to flatten the surfaces of the DTR medium, it may be considered to repeat the processes of depositing a nonmagnetic material in the recesses between the magnetic patterns and on the magnetic patterns and etching back the nonmagnetic material. However, when deposition and etching-back of nonmagnetic material are repeated, the thickness of the nonmagnetic material may be uneven, and favorable reproduction may be difficult. Since such thickness dispersion of nonmagnetic material varies depending on manufacturing apparatuses, the problem cannot be solved substantially by a method of adjusting the manufacturing apparatuses individually.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a plan view of a DTR medium according to an embodiment along the circumferential direction;

FIG. 3 is a top view of an apparatus for manufacturing the DTR medium according to the embodiment;

FIGS. 4A to 4D are plan views showing the states of a carrier in a substrate rotation chamber;

DETAILED DESCRIPTION

Figure 2A:
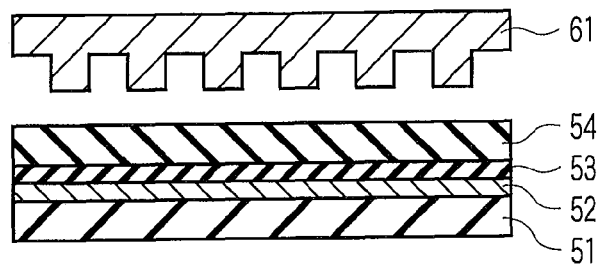
FIGS. 2A to 2K are cross-sectional views showing a manufacturing method of the DTR medium according to the embodiment.

Various embodiments according to the invention will be described hereinafter with reference to the accompanying drawings. In general, according to one embodiment of the invention, there is provided a method of manufacturing a discrete track recording medium, comprising: forming protruded magnetic patterns on a substrate; and repeating processes of depositing a nonmagnetic material so as to be filled in recesses between the magnetic patterns and etching back the nonmagnetic material two or more times with rotating the substrate in a plane thereof by an angle less than one revolution. According to another embodiment of the present invention, there is provided a discrete track recording medium comprising: protruded magnetic patterns and a nonmagnetic material filled in recesses between the magnetic patterns formed on a substrate, wherein six or more fingers as marks of holding parts for the substrate in depositing the nonmagnetic material are formed in peripheral edge portions of the substrate.

FIG. 1 is a plan view of a DTR medium according to an embodiment of the invention along the circumferential direction. As shown in FIG. 1, servo zones 2 and data zones 3 are alternately formed along the circumferential direction of a DTR medium 1. The servo zone 2 includes a preamble section 21, address section 22, and burst section 23. The data zone 3 includes discrete tracks 31.

Referring now to FIGS. 2A to 2K, a manufacturing method of the DTR medium according to the embodiment of the invention is described. To simplify the illustration, herein, only one side of the substrate is processed.

On a glass substrate 51, a soft magnetic underlayer (not shown) made of CoZrNb with a thickness of 120 nm, an underlayer for orientation control (not shown) made of Ru with a thickness of 20 nm, a magnetic recording layer 52 made of CoCrPt—$SiO_2$ with a thickness of 20 nm, and a protective layer 53 made of carbon (C) with a thickness of 4 nm are successively formed. To simplify the illustration, the soft magnetic underlayer and the orientation control layer are not shown. On the protective layer 53, spin-on-glass (SOG) with a thickness of 100 nm is formed as a resist 54 by spin-coating. A stamper 61 is arranged to face the resist 54. The stamper 61 has patterns of protrusions and recesses in an inverted form of the magnetic patterns shown in FIG. 1 (FIG. 2A).

Figure 2B:
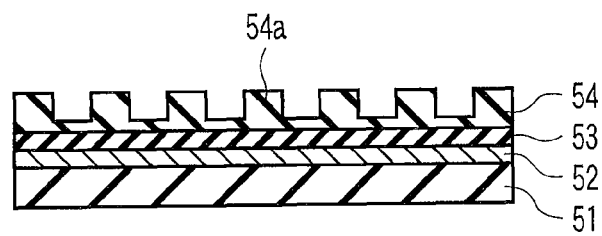

Imprinting is performed by using the stamper 61 to form protrusions 54a of the resist 54 corresponding to the recesses in the stamper 61 (FIG. 2B).

Figure 2C:
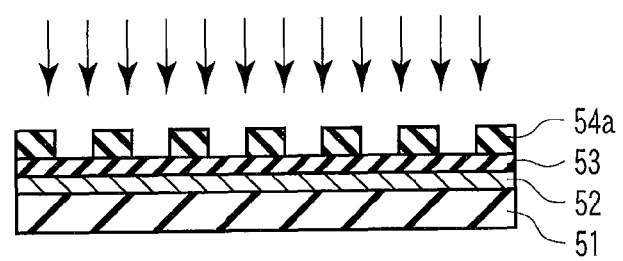

Etching is performed with an ICP (inductively coupled plasma) etching apparatus to remove resist residues remaining on the bottoms of the recesses of the patterned resist 54. The conditions in the process are as follows: for instance, $CF_4$ is used as the process gas, the chamber pressure is set to 2 mTorr, the coil RF power and the platen RF power are set to 100 W, respectively, and the etching time is set to 30 seconds (FIG. 2C).

Figure 2D:
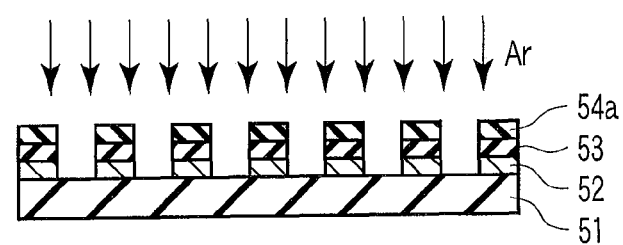

Using the resist patterns (SOG) left unremoved as etching masks, ion milling is performed with an ECR (electron cyclotron resonance) ion gun to etch the protective layer 53 with a thickness of 4 nm and the magnetic recording layer 52 with a thickness of 20 nm (FIG. 2D). The conditions in the process are as follows: for instance, Ar is used as the process gas, the microwave power is set to 800 W, the acceleration voltage is set to 500V and the etching time is set to 3 minutes.

Figure 2E:
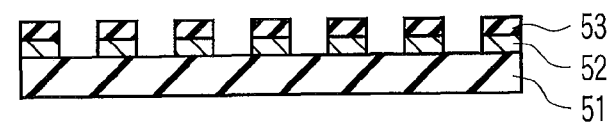

Then, the resist patterns (SOG) are stripped off with a RIE apparatus (FIG. 2E). The conditions in the process are as follows: for instance, $CF_4$ gas is used as the process gas, the chamber pressure is set to 100 mTorr and the power is set to 100 W.

Figure 2F:
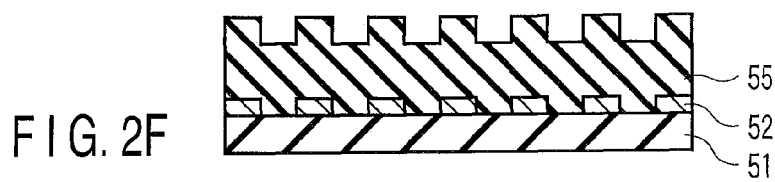

Next, a nonmagnetic material 55 made of Ru is deposited so as to be filled in the recesses between the magnetic patterns and stacked on the magnetic patterns by DC sputtering (FIG. 2F). The conditions in the process are as follows: a Ru target is used in DC sputtering, the Ar flow rate is set to 100 sccm, the chamber pressure is set to 0.5 Pa, the sputtering time is set to 10 seconds, and a Ru film with a thickness of 50 nm is deposited. The thickness of the nonmagnetic material 55 is preferably 30 to 100 nm. If the thickness of the nonmagnetic material is smaller than the depth of the recesses, the magnetic recording medium may be damaged in the next process of etch-back. In this stage, as shown in FIG. 2F, the surface is not flat, and the depth of recesses is about 20 nm. However, the pattern width is narrowed.

In this process, Ru was used as the nonmagnetic material 55 because a faster DC sputtering rate is provided and dusts are less likely to occur. As the nonmagnetic material 55, meanwhile, SiOC, $SiO_2$, SiC, SiN or other Si-based nonmagnetic material may be used.

Figure 2G:
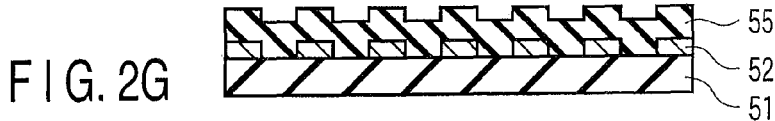

Next, the nonmagnetic material 55 is etched back (FIG. 2G). The conditions in the process are as follows: an ECR ion gun is used, the microwave power is set to 800 W, the acceleration voltage is set to 500V, and Ar ions are applied for 30 seconds. In these conditions, the non-magnetic material 55 is etched by 20 nm. As a result, the depth of the surface recesses is reduced to 10 nm. By this process, the surface roughness of the medium is decreased, and the recess depth is reduced to half. This process is intended to modify the surface through etch-back of the non-magnetic material 55, and thus the conditions of the ECR ion gun such as the process time are not so important parameters. The longer the ion irradiation time, the greater the effects of decreasing the surface roughness and reducing the recess depth, but it is necessary to make the deposited nonmagnetic material thicker in the filling process of the nonmagnetic material 55 in FIG. 2F.

When SiOC, $SiO_2$, SiC, SiN or other Si-based nonmagnetic material is used as the nonmagnetic material 55 in the deposition process in FIG. 2F, it can be etched back by using a mixed gas of Ar and fluorine-containing gas such as $CF_4$. In this case, as compared with the case of etching back by using Ar alone, the decreasing effect of surface roughness is inferior, but the reducing effect of recess depth is improved.

Figure 2H:
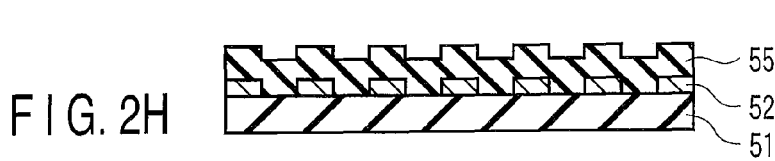

Then, in the embodiment, the substrate 51 is rotated in the plane thereof by an angle of less than one revolution (FIG. 2H). Successively, deposition of nonmagnetic material (FIG. 2F) and etch-back of nonmagnetic material (FIG. 2G) are repeated. For example, when the substrate 51 is rotated by 120 degrees, steps 3f, 3g and 3h are repeated two times. Then steps 3i and 3j are performed, and therefore, when the substrate rotation angle is 120 degrees, deposition and etching-back of nonmagnetic material are repeated by a total of three times. Thus, repetitions of deposition and etching-back of nonmagnetic material by two or more times with rotating the substrate by an angle of less than one revolution in the plane can make the thickness of the nonmagnetic material on the substrate surface uniform.

The relation between the substrate rotation angle and the number of times of repetition of steps 3f, 3g and 3h is three times for 90 degrees, five times for 60 degrees, seven times for 45 degrees, 11 times for 30 degrees, and 23 times for 15 degrees. At 180 degrees, the above operation is performed only one time. Thus, the substrate rotation angle is preferably 15 to 180 degrees per rotation. If the substrate rotation angle is less than 15 degrees, it takes more than 1 hour in the repetitions of processes of FIGS. 2F, 2G and 2H, which is not practical from the viewpoint of throughput.

In this substrate rotation process, the substrate may be cooled. By the processes of FIGS. 2F and 2G, heat is accumulated in the substrate, and it is preferred to cool the substrate in the substrate rotation process. If the substrate is merely rotated in the state that the substrate rotation chamber is kept at high degree of vacuum ($1.0 \times 10^{-4}$ Pa or less), only the cooling effect by radiation may be expected, and it takes a very long time for cooling. As a result, this leads to lowered throughput. Accordingly, by introducing Ar or $N_2$ into the substrate rotation chamber to set the chamber pressure to 0.3 to 10 Pa, cooling effect by heat conduction through gas molecules may be expected, in addition to the cooling effect by radiation. For example, by introducing Ar into the substrate rotation chamber at 100 sccm, adjusting the chamber pressure to 7 Pa and keeping the substrate for 30 seconds, a sufficient cooling effect is obtained. Further, the cooling efficiency may be enhanced by installing a cooling block in the substrate rotation chamber. It is preferable that the cooling block is formed of a material of a large thermal capacity, the surface of the cooling block is undulated for increasing surface area, and a refrigerant can be circulated inside the cooling block.

As the gas to be introduced in the substrate rotation chamber, $H_2$ and He are not suited to mass production because $H_2$ is not safe and He is expensive.

Figure 2I:
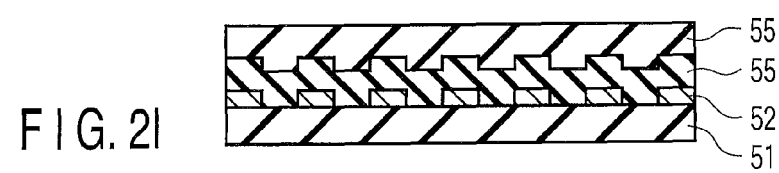

Next, a nonmagnetic material 55 of Ru is deposited again by DC sputtering (FIG. 2I). The conditions in the process are as follows: in DC sputtering, the chamber pressure is set to 0.52 Pa, the sputtering time is set to 70 seconds, and a Ru film with a thickness of 50 nm is deposited.

Figure 2J:
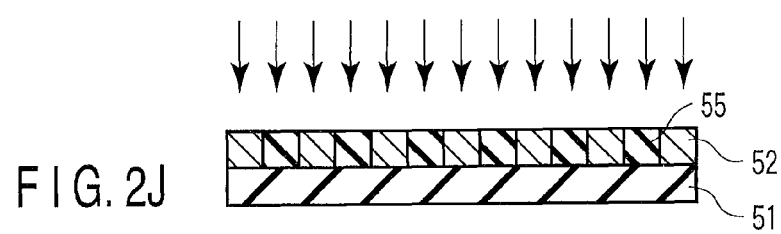

The nonmagnetic material 55 is etched back (FIG. 2J). The conditions in the process are as follows: an ECR ion gun is used, the microwave power is set to 800 W, the acceleration voltage is set to 700V, and etching is performed for about three minutes. Using a quadrupole mass spectrometer (Q-MASS), the end point of the etch-back is determined when Co contained in the magnetic recording layer is detected. In the method according to the embodiment of the invention, since it cannot be judged accurately how much the non-magnetic material 55 is etched in the etch-back process in FIG. 2G, it is hard to control the etch-back process on the basis of etch-back time. By contrast, the end point detection with the Q-MASS or other etching end point detector such as SIMS (secondary ion mass spectrometer) makes it possible to realize high-precision etch-back.

Figure 2K:
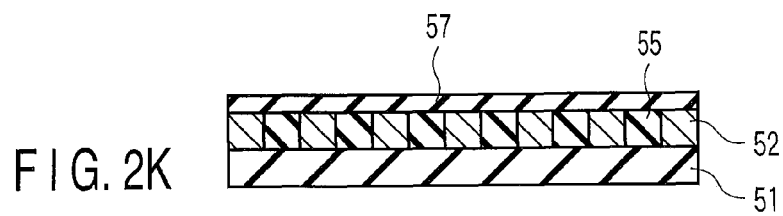

Finally, carbon (C) is deposited by CVD (chemical vapor deposition method) to form a protective layer 57 (FIG. 2K). Further, a lubricant is applied to the protective layer 57 to provide a DTR medium.

Next, a two-side processing method according to the embodiment of the manufacturing method is described below together with the manufacturing apparatus.

First, using a two-side spin coater, a resist is applied on both surfaces of a glass substrate for HDD of 1.8 inches in diameter. In this case, the inner periphery portion of the substrate is chucked and rotated. The rotating speed can be varied arbitrary up to 6,000 rpm. For example, while rotating at low speed of 500 rpm, the resist dispenser nozzle is moved until the resist is applied to the inner periphery of the substrate, and the resist is injected. While injecting the resist, the resist dispenser nozzle is moved in the direction toward the outer periphery of the disk, where the resist injection is stopped. Then, the rotating speed is increased to 6000 rpm, the resist is spun off and dried. SOG (spin-on-glass) is as a resist as described above, and the thickness thereof is adjusted to 100 nm.

In order to sandwich the substrate coated with the resist from front and rear sides, two stampers are tightly fitted to both surfaces, and the substrate is imprinted with a 30-ton press machine using a dedicated die specially designed to apply uniform load on the entire surfaces of substrate of 1.8 inches in diameter.

Then, using a DTR medium manufacturing apparatus as shown in FIG. 3 modified from Canon Anerva C3010 sputtering machine, both surfaces of the substrate are processed. FIG. 3 is a top view of the manufacturing apparatus used in the embodiment. The manufacturing apparatus includes a load/unload (L/UL) chamber 100, an ICP (inductively coupled plasma) etching chamber 101, an ECR (electron cyclotron resonance) ion gun chamber 102, an ICP etching chamber 103, a sputtering chamber 104, an ECR ion gun chamber 105, a substrate rotation chamber 106, a sputtering chamber 107, an ECR ion gun chamber 108, and a protective layer deposition chamber 109. In ordinary state, all chambers are held in high vacuum ($1.0 \times 10^{-4}$ Pa or less).

A substrate is set in the L/UL chamber 100 of the manufacturing apparatus in FIG. 3, the substrate is first conveyed to the ICP etching chamber 101 using a carrier 70, and the resist residues remaining on the bottoms of the recesses of the resist are removed as shown in FIG. 2C. In the ICP etching chamber 101, process gas such as $O_2$ or $CF_4$ is introduced into the chamber, and an inductively coupled plasma (ICP) is generated by the coil, and ions and radicals in the plasma are attracted by a cathode (platen) on which the substrate is mounted, and reactive ion etching (RIE) is carried out.

The substrate is conveyed into the ECR ion gun chamber 102, the protective layer and the magnetic recording layer are etched using the resist patterns as the etching masks as shown in FIG. 2D, and magnetic patterns are formed. In the ECR ion gun chamber 102, gas such as Ar, $O_2$, $CF_4$ is ionized in the plasma generated by ECR (electron cyclotron resonance), and is accelerated by the grid, and the atoms are impinged against the substrate surface for etching.

The substrate is conveyed to the ICP etching chamber 103, and the resist (SOG) is stripped as shown in FIG. 2E. This ICP etching chamber 103 has a same function as the ICP etching chamber 101.

The substrate is conveyed to the sputtering chamber 104, and a nonmagnetic material is deposited as shown in FIG. 2F. The substrate is conveyed to the ECR ion gun chamber 105, and the nonmagnetic material is etched back as shown in FIG. 2G.

The substrate is conveyed to the substrate rotation chamber 106, and the substrate is rotated in the plane thereof by an angle of less than one revolution as described in FIG. 2H. The substrate may be cooled at this time by introducing a cooling gas into the substrate rotation chamber 106. Alternatively, a cooling block may be installed inside the substrate rotation chamber 106.

To repeat deposition and etch-back of nonmagnetic material plural times, the substrate is returned to the sputtering chamber 104 to deposit the nonmagnetic material on the substrate, the substrate is conveyed to the ECR ion gun chamber 105 to etch back the nonmagnetic material, and the substrate is conveyed to the substrate rotation chamber 106 to rotate the substrate in the plane thereof by an angle of less than one revolution.

The substrate is conveyed to the sputtering chamber 107, and a nonmagnetic material is deposited as shown in FIG. 2I. The substrate is conveyed to the ECR ion gun chamber 108, and the nonmagnetic material is etched back as shown in FIG. 2I.

The substrate is conveyed to the protective layer deposition chamber 109, and a carbon protective layer is deposited as shown in FIG. 2J. In the protective layer deposition chamber 109, it is preferable that $C_2H_4$ or the like is used as material gas and a carbon protective film is deposited by CVD (chemical vapor deposition). Alternatively, a carbon protective film may be sputter-deposited by simple DC sputtering.

Figure 5:
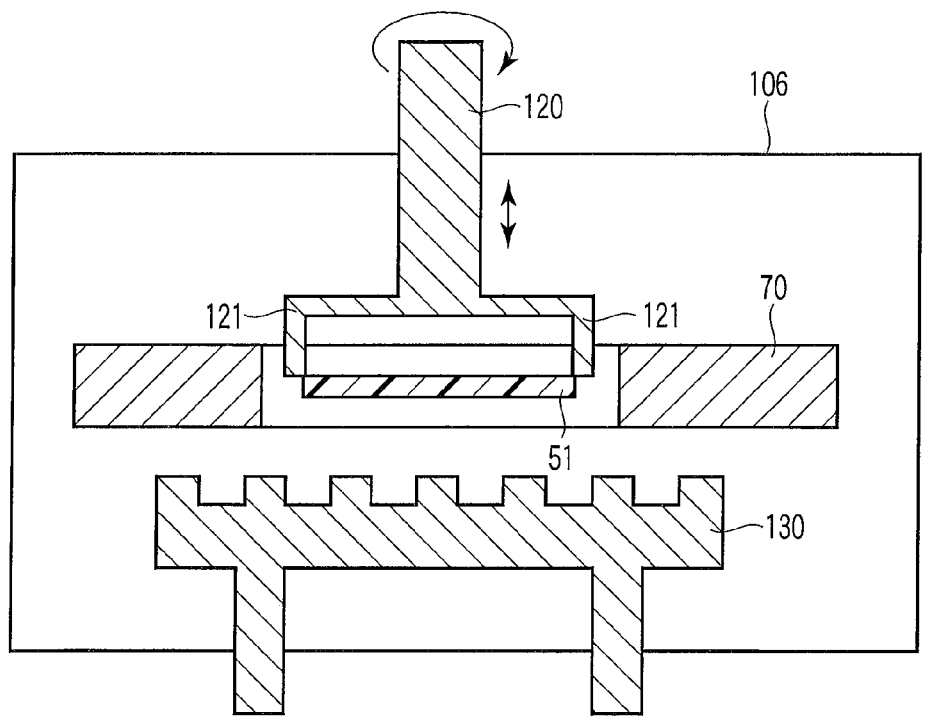
FIG. 5 is a cross-sectional view explaining a method of rotating the substrate in the substrate rotation chamber.

Referring now to FIGS. 4A to 4D and 5, the method of rotating the substrate in the substrate rotation chamber 106 is described. FIGS. 4A to 4D are plan views showing the state of the carrier in the substrate rotation chamber 106. FIG. 5 is a cross-sectional view illustrating the method of rotating the substrate in the substrate rotation chamber 106.

As shown in FIG. 4A, the substrate 51 is placed in the central hole of the carrier 70, and is conveyed while its peripheral edge is held by a pressing pawl 71 provided with a leaf spring and two fixed pressing pawls 72, 72. As shown in FIG. 5, the substrate rotation chamber 106 is provided with a substrate chuck 120 capable of thrust movement and rotation, and the outer circumference of the substrate 51 is held by three pawls 121. The substrate rotation chamber 106 is also provided with a cooling block 130. The surface of the cooling block 130 is undulated, and a refrigerant circulates inside thereof.

First, as shown in FIG. 4B, the outer peripheral edge of the substrate 51 is held by three pawls 121 of the substrate chuck 120, and the pressing pawl 71 provided with a leaf spring on the carrier 70 is released. As shown in FIG. 4C, the substrate chuck 120 holding the substrate 51 is rotated by a specified angle (for example, 90 degrees). As shown in FIG. 4D, the substrate 51 is held again by the pressing pawl 71 provided with a leaf spring and two fixed pressing pawls 72, 72 to be held by the carrier 70, and the substrate chuck 120 is drawn back. Thus, the substrate 51 is rotated in the plane by an angle of less than one revolution, and the carrier 70 is returned to the sputtering chamber 104.

Next, preferable materials to be used in the embodiments of the present invention will be described.

<Substrate>

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Magnetic Recording Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are deteriorated, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be deteriorated. The perpendicular squareness of the perpendicular magnetic recording layer is preferably 0.8 or more. If the perpendicular squareness is less than 0.8, the thermal fluctuation resistance tends to be deteriorated.

<Protective Layer>

The protective layer is provided for the purpose of preventing corrosion of the perpendicular magnetic recording layer and also preventing the surface of a medium from being damaged when the magnetic head is brought into contact with the medium. Examples of the material of the protective layer include those containing C, $SiO_2$ or $ZrO_2$. The thickness of the protective layer is preferably 1 to 10 nm. This is preferable for high-density recording because the distance between the head and the medium can be reduced. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective layer for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Next, preferred manufacturing conditions in each process in the embodiments of the present invention will be described.

<Imprinting>

A resist is applied to the surface of a substrate by spin-coating and then, a stamper is pressed against the resist to thereby transfer the patterns of the stamper to the resist. As the resist, for example, a general novolak-type photoresist or spin-on-glass (SOG) may be used. The surface of the stamper on which patterns of protrusions and recesses corresponding to servo information and recording tracks are formed is made to face the resist on the substrate. In this process, the stamper, the substrate and a buffer layer are placed on the lower plate of a die set and are sandwiched between the lower plate and the upper plate of the die set to be pressed under a pressure of 2000 bar for 60 seconds, for example. The height of the protrusions of the patterns formed on the resist by imprinting is, for instance, 60 to 70 nm. The above conditions are kept for about 60 seconds for transporting the resist to be excluded. In this case, if a fluorine-containing peeling agent is applied to the stamper, the stamper can be peeled from the resist satisfactorily.

<Removal of Resist Residues>

Resist residues left unremoved on the bottoms of the recesses of the resist are removed by RIE (reactive ion etching). In this process, an appropriate process gas corresponding to the material of the resist is used. As the plasma source, ICP (inductively coupled plasma) apparatus capable of producing high-density plasma under a low pressure is preferable, but an ECR (electron cyclotron resonance) plasma or general parallel-plate RIE apparatus may be used.

<Etching of Magnetic Recording Layer>

After the resist residues are removed, the magnetic recording layer is processed using the resist patterns as etching masks. For the processing of the magnetic recording layer, etching using Ar ion beams (Ar ion milling) is preferable. The processing may be carried out by RIE using Cl gas or a mixture gas of CO and $NH_3$. In the case of RIE using the mixture gas of CO and $NH_3$, a hard mask made of Ti, Ta or W is used as an etching mask. When RIE is used, a taper is scarcely formed on the side walls of the protruded magnetic patterns. In processing the magnetic recording layer by Ar ion milling capable of etching any material, if etching is carried out under the conditions that, for example, the acceleration voltage is set to 400V and incident angle of ions is varied between 30° and 70°, a taper is scarcely formed on the side walls of the protruded magnetic patterns. In milling using an ECR ion gun, if etching is carried out under static opposition arrangement (incident angle of ions is 90°), a taper is scarcely formed on the side walls of the protruded magnetic patterns.

<Stripping of Resist>

After the magnetic recording layer is etched, the resist is stripped off. When a general photoresist is used as the resist, it can be easily stripped off by oxygen plasma treatment. Specifically, the photoresist is stripped off by using an oxygen ashing apparatus under the conditions that the chamber pressure is 1 Torr, power is 400 W and processing time is 5 minutes. When SOG is used as the resist, SOG is stripped off by RIE using fluorine-containing gas. As the fluorine-containing gas, $CF_4$ or $SF_6$ is suitable. Note that, it is preferable to carry out rinsing with water because the fluorine-containing gas reacts with moisture in the atmosphere to produce an acid such as HF and $H_2SO_4$.

<Etch-Back of Nonmagnetic Material>

Etch-back of the nonmagnetic material is carried out until the ferromagnetic film (or the carbon protective film on the ferromagnetic film) is exposed. This etch-back process is preferably carried out by Ar ion milling or etching with an ECR ion gun.

<Deposition of Protective Layer and Aftertreatment>

After etch-back, a carbon protective layer is deposited. The carbon protective layer may be deposited by CVD, sputtering or vacuum evaporation. CVD produces a DLC film containing a large amount of $sp^3$-bonded carbon. The carbon protective layer with a thickness less than 2 nm is not preferable because it results in unsatisfactory coverage. Whereas, a carbon protective layer with a thickness exceeding 10 nm is not preferable because it increases magnetic spacing between a read/write head and a medium, leading to a reduction in SNR. A lubricant is applied to the surface of the protective layer. As the lubricant, for example, perfluoropolyether, fluorinated alcohol, fluorinated carboxylic acid or the like is used.

EXAMPLES

Example 1

Using a stamper having patterns of protrusions and recesses of servo patterns (preamble, address, burst) and recording tracks formed thereon as shown in FIG. 1, a DTR medium was manufactured in the method shown in FIGS. 2A to 2K. In the process of FIG. 2F, a Ru film was deposited in a thickness of 50 nm at Ar flow rate of 100 sccm and chamber pressure of 0.52 Pa by DC sputtering. In the process of FIG. 2G, the Ru film was etched back by applying Ar ions for 60 seconds under microwave power of 800 W and acceleration voltage of 500V using an ECR ion gun. In the process of FIG. 2H, the substrate was rotated by 120 degrees in the substrate rotation chamber. The processes of FIGS. 2F, 2G and 2H were repeated. In succession, in the process of FIG. 2I, a Ru film was deposited in a thickness of 50 nm at Ar flow rate of 100 sccm and chamber pressure of 0.52 Pa by DC sputtering. In the process of FIG. 2J, the Ru film was etched back until Co in the magnetic recording layer was detected under the microwave power of 800 W and acceleration voltage of 500V using an ECR ion gun. Then, a carbon protective layer of 4 nm in thickness was deposited by sputtering to provide a DTR medium.

In-plane thickness distribution was measured with an optical surface analyzer (OSA). As a result, thickness dispersion of the nonmagnetic material was not observed. Sectional TEM (transmission electron microscope) observation revealed that fine recesses of about 4 nm in depth were left on the medium surface. When read signals were investigated with a spin-stand, dispersion of signal intensity was not observed.

Comparative Example 1

A DTR medium was manufactured in the same manner as in example 1 except that the substrate was not rotated.

As a result of in-plane thickness distribution measurement with OSA, thickness dispersion of the nonmagnetic material was observed. When read signals were investigated with a spin-stand, the signal intensity in the portion where a thicker nonmagnetic material was observed by OSA was about ½ of the signal intensity in the portion where a thinner nonmagnetic material was observed. Since the read signal intensity is proportional to the distance (magnetic spacing) between the head and the recording layer of the DTR medium, the reason why weak signal intensity is observed locally is considered to be caused by remained excessive nonmagnetic material. In the case where there is dispersion in read signal intensity, the medium cannot be used for HDD.

Example 2

A DTR medium was manufactured in the same manner as in example 1 except that the substrate rotation angle was set at 45 degrees, and that the processes of FIGS. 2F, 2G and 2H were repeated seven times.

Sectional TEM observation revealed that the medium surface was very smoothly flattened. As a result of in-plane thickness distribution measurement with OSA, thickness dispersion of the nonmagnetic material was not observed. When read signals were investigated with a spin-stand, dispersion of signal intensity was not observed. Thus, decreasing the substrate rotation angle and increasing the number of repetitions of deposition and etching-back of nonmagnetic material enhance the flatness of the medium surface.

However, the absolute value of signal intensity was lowered to 0.8 times of the DTR medium manufactured in example 1. The result is considered because the number of repetitions of deposition and etching-back of nonmagnetic material is increased, bringing about heat accumulation in the substrate, by which the magnetic characteristics of the DTR medium are deteriorated.

The magnetic characteristics of the DTR medium were evaluated with a Kerr measuring device. As a result, the coercivity (Hc) was 5.2 kOe, the reversed magnetic domain nucleating magnetic field (Hn) was 1.8 kOe, and the saturation magnetic field (Hs) was 10.0 kOe. This DTR medium indicated slightly higher Hc and Hs as compared with those of the magnetic recording layer in itself. Since Hs is as high as 10 kOe, saturation recording may not be achieved in an existing recording head.

Example 3

A DTR medium was manufactured in the same manner as in example 1 except that the substrate rotation angle was set at 15 degrees, and that the processes of FIGS. 2F, 2G and 2H were repeated 23 times, while introducing Ar gas by 100 sccm into the chamber during rotation of the substrate and setting the chamber pressure at 7 Pa.

Sectional TEM observation revealed that the medium surface was very smoothly flattened. As a result of in-plane thickness distribution measurement with OSA, thickness dispersion of the nonmagnetic material was not observed. When read signals were investigated with a spin-stand, dispersion of signal intensity was not observed, and also deterioration in signal intensity was not observed.

The magnetic characteristics of the DTR medium were evaluated with a Kerr measuring device. As a result, the coercivity (Hc) was 4.8 kOe, the reversed magnetic domain nucleating magnetic field (Hn) was 2.0 kOe, and the saturation magnetic field (Hs) was 8.0 kOe. This DTR medium indicated magnetic characteristics not so much different from those of the magnetic recording layer in itself. By introducing gas during rotation of the substrate, the substrate was cooled effectively, and deterioration of magnetic characteristics of DTR medium could be suppressed.

Similar experiments were conducted by introducing $N_2$ instead of Ar, and the magnetic characteristics were not so much changed. Thus, it is found effective to rotate the substrate and to cool the substrate simultaneously by introducing the gas during rotation of the substrate.

Example 4

A DTR medium was manufactured in the same manner as in example 1 except that the substrate rotation angle was set at 90 degrees, and that the processes of FIGS. 2F, 2G and 2H were repeated three times.

Figure 6:
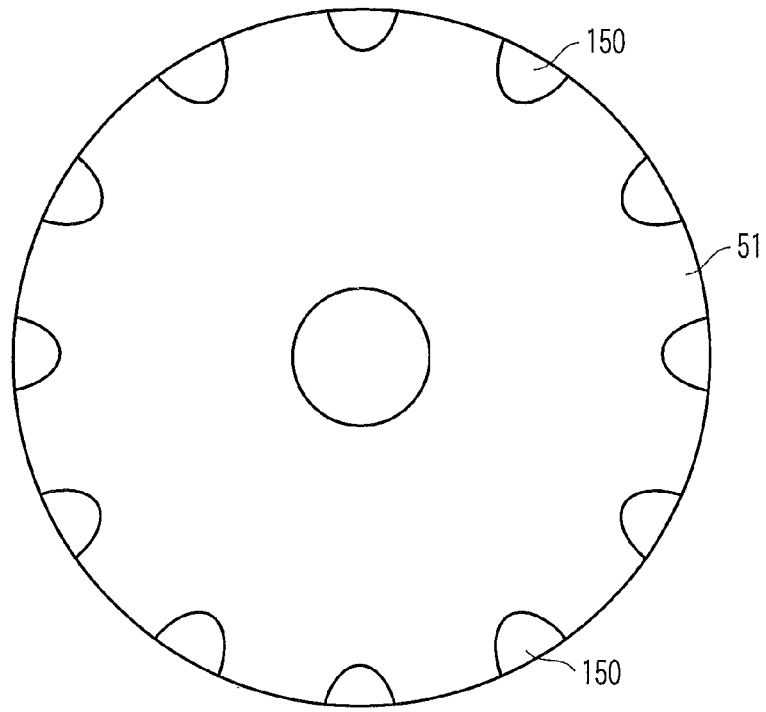
FIG. 6 is a diagram showing fingers occurring in a DTR medium in Example 4.

The in-plane thickness distribution was measured by OSA, and as shown in FIG. 6, marks of pressing pawls of the carrier formed when depositing the nonmagnetic material film were observed at 12 portions in the peripheral edge of the substrate. These marks are called "fingers".

Thus, when using three pressing pawls of the carrier, six or more fingers are formed in the substrate rotating process.

Similarly, when using four pressing pawls of the carrier, eight or more fingers are formed in the substrate rotating process.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of manufacturing a discrete track recording medium, comprising:
    forming protruded magnetic patterns on a substrate; and
    repeating processes of depositing a nonmagnetic material so as to be filled in recesses between the magnetic patterns and etching back the nonmagnetic material two or more times with rotating the substrate in a plane thereof by an angle less than one revolution.

2. The method of claim 1, wherein the substrate is rotated in the plane thereof by an angle of 15 degrees to 180 degrees per rotating.

3. The method of claim 1, wherein Ar or $N_2$ is introduced into a chamber where the substrate is rotated and a chamber pressure is set to 0.3 to 10 Pa during rotation of the substrate in the plane thereof.

* * * * *